United States Patent
Diachina et al.

(10) Patent No.: US 10,225,101 B2
(45) Date of Patent: Mar. 5, 2019

(54) EXTENDED DISCONTINUOUS RECEIVE (EDRX) CYCLES

(71) Applicant: TELEFONAKTIEBOLAGET LM ERICSSON (PUBL), Stockholm (SE)

(72) Inventors: John Walter Diachina, Garner, NC (US); Nicklas Johansson, Brokind (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 313 days.

(21) Appl. No.: 14/996,055

(22) Filed: Jan. 14, 2016

(65) Prior Publication Data
US 2016/0211986 A1    Jul. 21, 2016

Related U.S. Application Data

(60) Provisional application No. 62/104,623, filed on Jan. 16, 2015.

(51) Int. Cl.
| | | |
|---|---|---|
| *H04L 12/403* | (2006.01) | |
| *H04W 68/00* | (2009.01) | |
| *H04W 4/70* | (2018.01) | |
| *H04W 76/28* | (2018.01) | |

(52) U.S. Cl.
CPC ........... *H04L 12/4035* (2013.01); *H04W 4/70* (2018.02); *H04W 68/00* (2013.01); *H04W 68/005* (2013.01); *H04W 76/28* (2018.02)

(58) Field of Classification Search
CPC .............. H04L 12/4035; H04W 68/00; H04W 68/005; H04W 76/048
See application file for complete search history.

(56) References Cited

U.S. PATENT DOCUMENTS

| | | | |
|---|---|---|---|
| 2005/0002407 A1 | 1/2005 | Shaheen et al. | |
| 2006/0262742 A1 | 11/2006 | Dommaraju et al. | |
| 2010/0130237 A1 | 5/2010 | Kitazoe et al. | |
| 2010/0150114 A1* | 6/2010 | Che | H04L 1/0026 370/336 |
| 2013/0301501 A1* | 11/2013 | Olvera-Hernandez | H04W 76/048 370/311 |
| 2014/0016614 A1* | 1/2014 | Velev | H04W 4/005 370/331 |
| 2014/0341140 A1* | 11/2014 | Beale | H04W 28/20 370/329 |
| 2016/0081022 A1* | 3/2016 | Haneji | H04W 52/0229 370/311 |

(Continued)

OTHER PUBLICATIONS

3GPP TR 23.709 V0.2.0 (Nov. 2014), 3rd Generation Partnership Project; Technical Specification Group Services and System Aspects; Study on Optimizations to Support High Latency Communications; Stage 2 (Release 13), red-marked version, available Dec. 4, 2014, paragraph [04.1], paragraph [05.2].

(Continued)

*Primary Examiner* — Rhonda L Murphy (57) ABSTRACT

A core network node (e.g., Serving GPRS Support Node), a radio access network node (e.g., Base Station Subsystem) and various methods are described herein for implementing longer paging cycles (e.g., Extended Discontinuous Receive (eDRX) cycles) for wireless devices in a wireless communication network.

34 Claims, 5 Drawing Sheets

(56) References Cited

U.S. PATENT DOCUMENTS

| | | |
|---|---|---|
| 2016/0135124 A1* | 5/2016 | Vos .................. H04W 52/0216 370/311 |
| 2016/0286385 A1 | 9/2016 | Ryu et al. |
| 2016/0295504 A1 | 10/2016 | Wang et al. |
| 2016/0330791 A1 | 11/2016 | Vajapeyam et al. |
| 2017/0367044 A1 | 12/2017 | Fujishiro et al. |

OTHER PUBLICATIONS

Qualcomm Incorporated: "Solution for Buffering downlink data in S-GW for UEs not immediately reachable", SA WG2 Temporary Document, SA WG2 Meeting #S2-106, S2-144170, (revision of S2-14xxx), Nov. 17-21, 2014, San Francisco, USA, the whole document.

Alcatel-Lucent et al: "HLCOM Solution based on DL buffering in SGW", SA WG2 Temporary Document, SA WG2 Meeting #106, S2-144597, (revision of S2-144385 ), Nov. 17-21, 2014, San Francisco, California, USA, the whole document.

Alcatel-Lucent et al.: "HLCOM Solution based on DL buffering in SGW", 3GPP draft; SA WG2 Meeting #106, S2-144385, merge of S2-144112, S2-143939 & S2-144170, Nov. 17-21, 2014, San Francisco, California, USA, the whole document.

Ericsson: "GSM Evolution for cellular IoT—PCH Overview". 3GPP TSG Geran#63. Tdoc GP-140605. Ljubljana, Slovenia. Aug. 25-29, 2014, the whole document.

Ericsson: "pCR for uPoD eDRX". 3GPP TSG Geran#64. Tdoc GP-140897. San Francisco, USA. Nov. 17-21, 2014, the whole document.

Ericsson: "MS Energy Consumption Evaluation, PSM vs. eDRX". 3GPP TSG Geran#64. Tdoc GP-140910. San Francisco, USA. Nov. 17-21, 2014, the whole document.

Ericsson LM, "Time Coordinated Cells for eDRX", 3GPP TSG GERAN #66, Tdoc GP-150426; Agenda item 7.1.5.3.4, 7.1.5.3.5, 7.2.5.3.3, 7.2.5.3.4; Vilnius, Lithuania; May 25-29, 2015; the whole document.

Ericsson LM, "pCR TR 45.820—EC-GSM, Time Coordinated Cells for eDRX", 3GPP TSG GERAN#66, Tdoc GP-150427; Agenda item 7.1.5.3.5, 7.2.5.3.4; Vilnius, Lithuania, May 25-May 29, 2015; the whole document.

Ericsson LM, "pCR TR 43.869—uPoD—Time Coordinated Cells for eDRX", 3GPP TSG GERAN#66, Tdoc GP-150428; Agenda item 7.1.5.3.4, 7.2.5.3.3; Vilnius, Lithuania; May 25-May 29, 2015; the whole document.

3GPP TS 36.331 V12.5.0 (Mar. 2015), 3rd Generation Partnership Project; Technical Specification Group Radio Access Network; Evolved Universal Terrestrial Radio Access (E-UTRA); Radio Resource Control (RRC); Protocol specification (Release 12), available Mar. 27, 2015, the whole document.

3GPP TS 45.002 V12.4.0 (Mar. 2015), 3rd Generation Partnership Project; Technical Specification Group GSM/EDGE Radio Access Network; Multiplexing and multiple access on the radio path (Release 12), available Mar. 21, 2015, the whole document.

3GPP TS 25.304 V12.5.0 (Mar. 2015), 3rd Generation Partnership Project; Technical Specification Group Radio Access Network; User Equipment (UE) procedures in idle mode and procedures for cell reselection in connected mode (Release 12), available Mar. 23, 2015, the whole document.

Ericsson, "EC-GSM—Paging Group Determination", 3GPP TSG GERAN #65, Tdoc GP-150133, Agenda item 7.1.5.3.5, 7.2.5.3.4; Shanghai, China; Mar. 9-13, 2015; the whole document.

Ericsson LM, "Pseudo CR 45.820—EC-GSM, Paging Group Determination", 3GPP TSG GERAN#65, GP-150259, Agenda item 7.1.5.3.5, 7.2.5.3.4; Shanghai, P.R. China; Mar. 9-13, 2015; the whole document.

3GPP TR 23.770 V0.2.0 (Apr. 2015), 3rd Generation Partnership Project; Technical Specification Group Services and System Aspects; Study on System Impacts of Extended DRX Cycle for Power Consumption Optimization; (Release 13), pp. 1-33, p. 8, line 2—p. 11, line 3.

"Intel Corporation: "Impacts of Unsynchronized Cells in a Routing Area onPaging with eDRX", 3GPP TSG GERAN Meeting #66, GP-150404, Vilnius, Lithuania, May 25-29, 2015, the whole document".

Ericsson LM, "Pseudo CR 45.820 Synchronized Cells for eDRX", 3GPP Draft; GPC150264, 3GPP TSG GERAN Fs_IoT_LC Adhoc#2, Sophia Antipolis, Apr. 20-23, 2015, the whole document.

3GPP TS 45.010 V12.0.0 (Sep. 2014), 3rd Generation Partnership Project; Technical Specification Group GSM/EDGE Radio Access Network; Radio subsystem synchronization (Release 12), the whole document.

3GPP TS 48.018 V12.4.0 (Nov. 2014), 3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 12), the whole document.

* cited by examiner

EXTENDED DISCONTINUOUS RECEIVE (EDRX) CYCLES

CLAIM OF PRIORITY

This application claims the benefit of priority to U.S. Provisional Application Ser. No. 62/104,623, filed on Jan. 16, 2015, the entire contents of which are hereby incorporated herein by reference for all purposes.

TECHNICAL FIELD

The present disclosure relates generally to the wireless communications field and, more particularly, to a core network node (e.g., Serving GPRS Support Node), a radio access network node (e.g., Base Station Subsystem) and various methods for implementing longer paging cycles (e.g., Extended Discontinuous Receive (eDRX) cycles) for wireless devices in a wireless communication network.

BACKGROUND

The following abbreviations and terms are herewith defined, at least some of which are referred to within the following description of the present disclosure.
3GPP 3rd-Generation Partnership Project
AGCH Access Grant Channel
ASIC Application Specific Integrated Circuit
BLER Block Error Rate
BSS Base Station Subsystem
CC Coverage Class
CCCH Common Control Channel
eDRX Extended Discontinuous Receive Cycle
EC-PCH Extended Coverage Paging Channel
DSP Digital Signal Processor
EDGE Enhanced Data rates for GSM Evolution
EGPRS Enhanced General Packet Radio Service
FN Frame Number
GSM Global System for Mobile Communications
GERAN GSM/EDGE Radio Access Network
GPRS General Packet Radio Service
HARQ Hybrid Automatic Repeat Request
IMSI International Mobile Subscriber Identity
IoT Internet of Things
LTE Long-Term Evolution
MF Multiframe
MFRMS Multiframes
MS Mobile Station
MTC Machine Type Communications
PCH Paging Channel
PDN Packet Data Network
PDTCH Packet Data Traffic Channel
PSM Power Saving Mode
RACH Random Access Channel
RAN Radio Access Network
RAI Routing Area Identity
RAU Routing Area Update
SGSN Serving GPRS Support Node
TDMA Time Division Multiple Access
TSG Technical Specifications Group
UE User Equipment
WCDMA Wideband Code Division Multiple Access
WiMAX Worldwide Interoperability for Microwave Access
Coverage Class: At any point in time a device belongs to a
  specific uplink/downlink coverage class that corresponds
  to either the legacy radio interface performance attributes
  that serve as the reference coverage for legacy cell planning (e.g., a Block Error Rate of 10% after a single radio
  block transmission on the PDTCH) or a range of degraded
  radio interface performance attributes compared to the
  reference coverage (e.g., up to 20 dB lower performance
  than that of the reference coverage). Coverage class
  determines the total number of blind transmissions to be
  used when transmitting/receiving radio blocks. An uplink/
  downlink coverage class applicable at any point in time
  can differ between different logical channels. Upon initiating a system access a device determines the uplink/
  downlink coverage class applicable to the RACH/AGCH
  based on estimating the number of blind transmissions of
  a radio block needed by the BSS receiver/device receiver
  to experience a BLER (block error rate) of approximately
  10%. The BSS determines the uplink/downlink coverage
  class to be used by a device on the device's assigned
  packet channel resources based on estimating the number
  of blind transmissions of a radio block needed to satisfy
  a target BLER and considering the number of HARQ
  retransmissions (of a radio block) that will, on average, be
  needed for successful reception of a radio block using that
  target BLER. Note: a device operating with radio interface performance attributes corresponding to the reference coverage is considered to be in the best coverage
  class (i.e., coverage class 1) and therefore does not make
  blind transmissions.
eDRX cycle: eDiscontinuous reception (eDRX) is a process
  of a wireless device disabling its ability to receive when
  it does not expect to receive incoming messages and
  enabling its ability to receive during a period of reachability when it anticipates the possibility of message
  reception. For eDRX to operate, the network coordinates
  with the wireless device regarding when instances of
  reachability are to occur. The wireless device will therefore wake-up and enable message reception only during
  pre-scheduled periods of reachability. This process
  reduces the power consumption which extends the battery
  life of the wireless device and is sometimes called (deep)
  sleep mode.
Nominal Paging Group: The specific set of EC-PCH blocks
  a device monitors once per eDRX cycle. The device
  determines this specific set of EC-PCH blocks using an
  algorithm that takes into account its IMSI, its eDRX cycle
  length and its downlink coverage class.

As described in the 3GPP TSG-GERAN Meeting #63 Tdoc GP-140605, entitled "GSM Evolution for cellular IoT—PCH Overview" dated Aug. 25-29, 2014, wireless devices (e.g., those used for machine type communications (MTC)) can operate using different coverage classes and can be expected to make use of different discontinuous receive (DRX) cycles ranging from minutes to hours or even days depending on the frequency of reachability desired for such wireless devices. The entire contents of GP-140605 are hereby incorporated by reference herein for all purposes.

If it is desired that a wireless device supports downlink reachability with a periodicity ranging from about 1 to 30 minutes, then the wireless device should be operated using the extended DRX (eDRX) based reachability, since the Power Saving Mode (PSM) based reachability will not allow for sufficient extension of battery lifetimes (e.g., 10 years) to be realized within this time range. In this regard, the PSM allows the wireless device to save battery life by informing the network about the periodicity with which the wireless device becomes reachable. Since the wireless device in PSM has a limited interval of reachability determined according to when its ready timer is active, delivery of any mobile terminated traffic will be forced to wait until this limited interval of reachability occurs in the wireless device. An increase in the reachability for the wireless device in PSM can be made by increasing the RAU frequency or by increasing the rate at which the wireless device sends periodic keep-alive messages both of which will start the ready-timer in the wireless device thereby making it accessible to the network. However, the increasing of the RAU frequency or the keep-alive transmission frequency are very energy consuming solutions which lower the battery lifetime for the wireless device.

Figure 1:
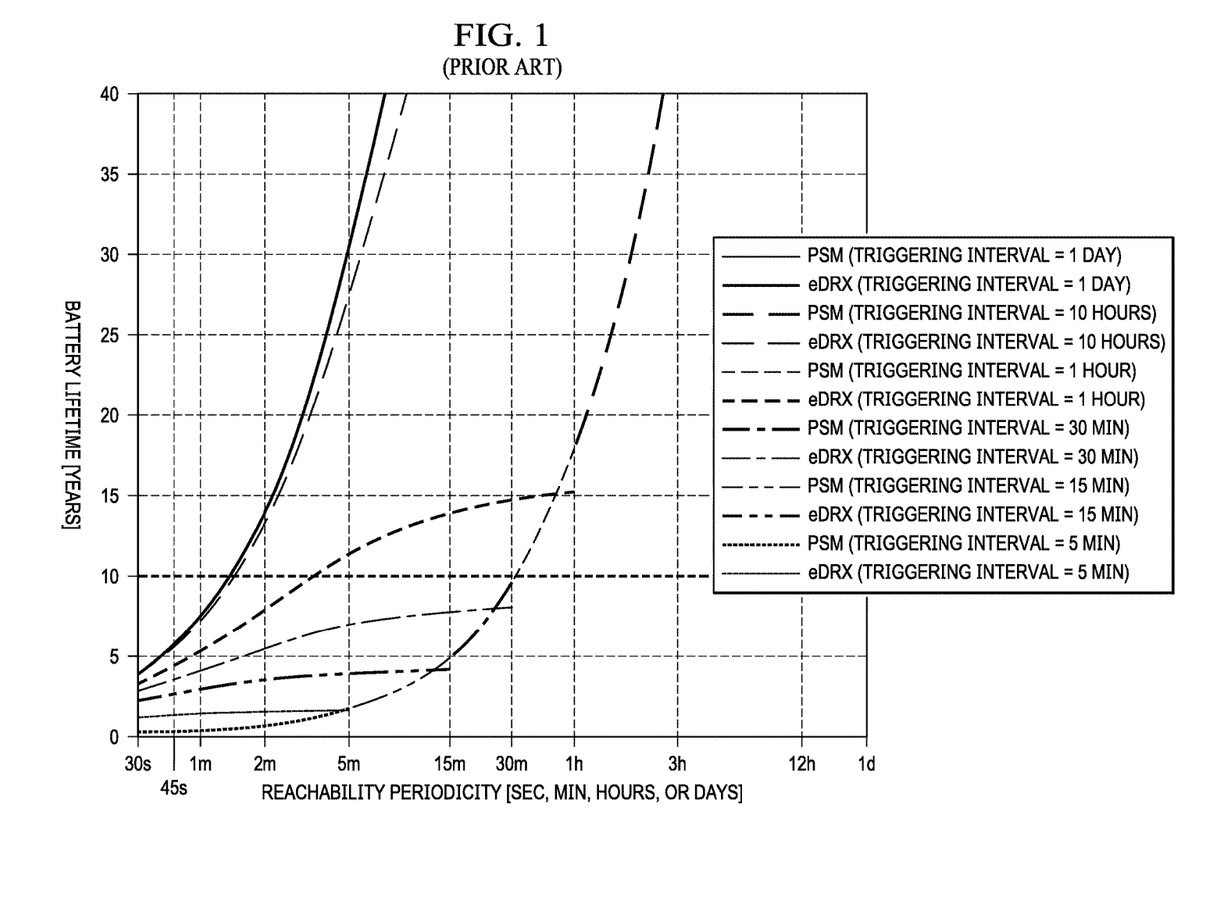
FIG. 1 (PRIOR ART) is a graph that illustrates simulated details about the battery lifetime of a wireless device for different triggering intervals when implementing the PSM functionality and the eDRX functionality.

The alternative, or perhaps complement, to the PSM functionality is the eDRX functionality (e.g., as discussed in the 3GPP TSG-GERAN Meeting #64 Tdoc GP-140897, entitled "pCR for uPoD eDRX" dated Nov. 17-21, 2014, the entire contents of which are hereby incorporated herein by reference for all purposes). The eDRX functionality will for a given periodicity of reachability almost always consume less energy than the energy consumed by using PSM. This is due to the energy saved because the wireless device only needs to listen to paging when using the eDRX functionality instead of periodically transmitting a RAU message or keep-alive message as required when using the PSM functionality. FIG. 1 (PRIOR ART) is a graph that illustrates simulated details about the battery lifetime of a wireless device for different triggering intervals when implementing the PSM functionality and the eDRX functionality. The PSM functionality, the eDRX functionality and the simulations comparing the two functionalities are all discussed in more detail in the 3GPP TSG-GERAN Meeting #64 Tdoc GP-140910, entitled "MS Energy Consumption Evaluation, PSM vs. eDRX" dated Nov. 17-21, 2014, the entire contents of which are hereby incorporated herein by reference for all purposes. However, as discussed below, when the eDRX functionality is implemented there can still be problems that should be addressed.

For instance, a SGSN (e.g., core network (CN) node) that has received an IP packet (e.g., containing a trigger) for delivery to a target wireless device that makes use of eDRX will, based on legacy procedures, respond by immediately sending a corresponding paging request for the target device to a BSS (e.g., RAN node). When this occurs, there is the possibility that the next paging based instance of reachability for the target wireless device may occur well beyond the point in time when the BSS receives the paging request. This can be problematic considering that (a) the BSS may be limited in how long the BSS can buffer the paging request while waiting for the next paging opportunity for the target wireless device operating in eDRX mode, and (b) the SGSN may consider the paging request to have failed or the target wireless device to be unreachable if the SGSN does not receive a corresponding page response from the BSS within a relatively short time frame. These problems and other problems are addressed by the present disclosure.

SUMMARY

A core network node (e.g., SGSN), a radio access network node (e.g., BSS) and various methods for addressing at least the aforementioned problems are described in the independent claims. Advantageous embodiments of the core network node (e.g., SGSN), the radio access network node (e.g., BSS), and the various methods are further described in the dependent claims.

In one aspect, the present disclosure provides a core network (CN) node configured to interact with a radio access network (RAN) node and a wireless device. The CN node comprises a processor and a memory that stores processor-executable instructions, wherein the processor interfaces with the memory to execute the processor-executable instructions, whereby the CN node is operable to perform a register operation, a first receive operation, a buffer operation, a calculate operation, a first transmit operation, a second receive operation, and a second transmit operation. In the register operation, the CN node registers the wireless device. In the first receive operation, the CN node receives an IP packet destined for the wireless device. In the buffer operation, the CN node buffers the IP packet for a predetermined time. In the calculate operation, the CN node calculates a next occurrence of a nominal paging group for the wireless device. In the first transmit operation, the CN node transmits a page request associated with the wireless device to the RAN node, wherein the page request is transmitted before (e.g., at a predetermined or determinable time before) the next occurrence of the nominal paging group for the wireless device (thereby allowing the RAN node sufficient time to prepare to transmit a corresponding page request to the wireless device over the radio interface at the next occurrence of the nominal paging group for the wireless device). In the second receive operation, the CN node receives a page response from the RAN node. In the second transmit operation, the CN node, upon receiving the page response, transmits the IP packet to the RAN node for delivery to the wireless device. An advantage of the CN node implementing these operations is that by deferring the transmission of the page request there will be a realistic expectation of the CN node receiving a corresponding page response from the wireless device shortly after the first transmit operation. This is beneficial since it avoids the page request timeout scenario that would otherwise commonly occur if the CN node were to use legacy procedures. In this regard, the traditional CN node transmits the page request associated with the wireless device to the RAN node without taking into account the eDRX cycle of the wireless device (i.e., the probability of the traditional CN node transmitting a page request shortly before the occurrence of the next nominal paging group for the wireless device without explicitly taking into account the wireless device's eDRX cycle is low). The penalty incurred by the traditional CN node experiencing the page request timeout scenario is that the traditional CN node may re-attempt paging (using an even greater set of cells for the paging re-attempt), thereby wasting processing power, and wasting signaling capacity on the data link to each RAN node to which the traditional CN node transmits either the initial page request or a re-attempted page request and potentially falsely concluding that the wireless device is unreachable (due to a lack of page response).

In another aspect, the present disclosure provides a method in a CN node configured to interact with a radio access network (RAN) node and a wireless device. The method comprises a registering step, a first receiving step, a buffering step, a calculating step, a first transmitting step, a second receiving step, and a second transmitting step. In the registering step, the CN node registers the wireless device. In the first receiving step, the CN node receives an IP packet destined for the wireless device. In the buffering step, the CN node buffers the IP packet for a predetermined time. In the calculating step, the CN node calculates a next occurrence of a nominal paging group for the wireless device. In the first transmitting step, the CN node transmits a page request associated with the wireless device to the RAN node, wherein the page request is transmitted before (e.g., at a predetermined or determinable time before) the next occurrence of the nominal paging group for the wireless device (thereby allowing the RAN node sufficient time to prepare to transmit a corresponding page request over the radio interface to the wireless device at the next occurrence of the nominal paging group for the wireless device). In the second receiving step, the CN node receives a page response from the RAN node. In the second transmit step, the CN node, upon receiving the page response, transmits the IP packet to the RAN node for delivery to the wireless device. An advantage of the CN node implementing these steps is that by deferring the transmission of the page request there will be a realistic expectation of the CN node receiving a corresponding page response from the wireless device shortly after the first transmitting step. This is beneficial since it avoids the page request timeout scenario that would otherwise commonly occur if the CN node were to use legacy procedures. In this regard, the traditional CN node transmits the page request associated with the wireless device to the RAN node without taking into account the eDRX cycle of the wireless device (i.e., the probability of the traditional CN node transmitting a page request shortly before the occurrence of the next nominal paging group for the wireless device without explicitly taking into account the wireless device's eDRX cycle is low). The penalty incurred by the traditional CN node experiencing the page request timeout scenario is that the traditional CN node may re-attempt paging (using an even greater set of cells for the paging re-attempt), thereby wasting processing power, and wasting signaling capacity on the data link to each RAN node to which the traditional CN node transmits either the initial page request or a re-attempted page request and potentially falsely concluding that the wireless device is unreachable (due to a lack of page response).

In yet another aspect, the present disclosure provides a RAN node configured to manage one or more cells and further configured to interact with a wireless device and a CN node. The RAN node comprises a processor and a memory that stores processor-executable instructions, wherein the processor interfaces with the memory to execute the processor-executable instructions, whereby the RAN node is operable to perform a transmit operation, a receive operation, and a calculate operation. In the transmit operation, the RAN node transmits a registration request associated with the wireless device to the CN node. In the receive operation, the RAN node receives a first page request associated with the wireless device from the CN node, wherein the first page request is received before (e.g., at a predetermined or determinable time before) a next occurrence of a nominal paging group for the wireless device. In the calculate operation, the RAN node calculates the next occurrence of the nominal paging group for the wireless device using information in the first page request. An advantage of the RAN node implementing these operations is that by doing so the RAN node is able to precisely determine the next instance of reachability for the wireless device on the radio interface and therefore transmit a page request using the radio resources corresponding to the next instance of wireless device reachability (i.e., using the next instance of the nominal paging group of the wireless device). In contrast, without the ability to precisely determine the next instance of reachability for the wireless device the RAN node would have to use some other paging solution none of which will be as power efficient (from a wireless device perspective) as the described operation since all of the other solutions will necessarily require the wireless device to read more than one instance of its nominal paging group per eDRX cycle to support reachability.

In still yet another aspect, the present disclosure provides a method in a RAN node configured to manage one or more cells and further configured to interact with a wireless device and a CN node. The method comprises a transmitting step, a receiving step, and a calculating step. In the transmitting step, the RAN node transmits a registration request associated with the wireless device to the CN node. In the receiving step, the RAN node receives a first page request associated with the wireless device from the CN node, wherein the first page request is received before (e.g., at a predetermined or determinable time before) a next occurrence of a nominal paging group for the wireless device. In the calculating step, the RAN node calculates the next occurrence of the nominal paging group for the wireless device using information in the first page request. An advantage of the RAN node implementing these steps is that by doing so the RAN node is able to precisely determine the next instance of reachability for the wireless device on the radio interface and therefore transmit a page request using the radio resources corresponding to the next instance of wireless device reachability (i.e., using the next instance of the nominal paging group of the wireless device). In contrast, without the ability to precisely determine the next instance of reachability for the wireless device the RAN node would have to use some other paging solution none of which will be as power efficient (from a wireless device perspective) as the described operation since all of the other solutions will necessarily require the wireless device to read more than one instance of its nominal paging group per eDRX cycle to support reachability. Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings.

DETAILED DESCRIPTION

Figure 2:
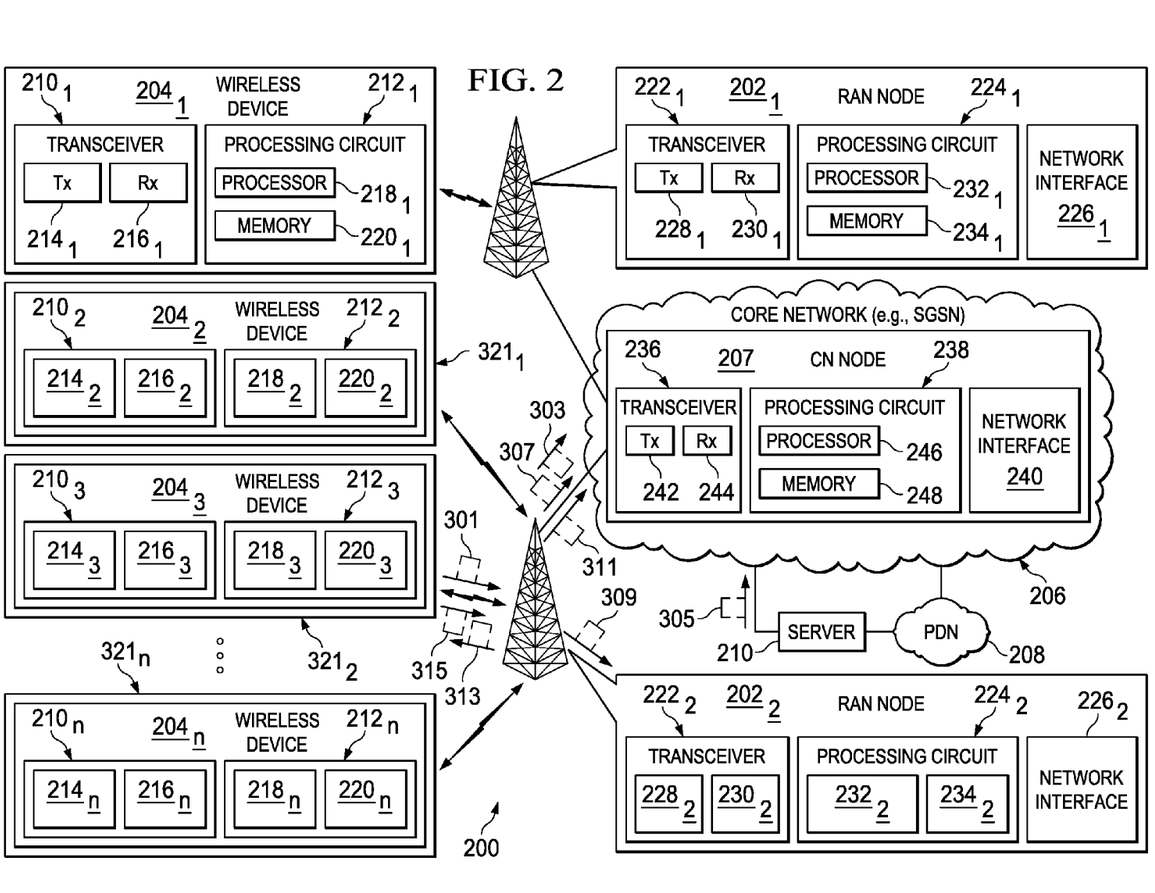
FIG. 2 is a diagram of an exemplary wireless communication network which includes a CN node and multiple RAN nodes which are configured in accordance with an embodiment of the present disclosure.

A discussion is provided first herein to describe an exemplary wireless communication network that includes a CN node (e.g., SGSN) and multiple RAN nodes (e.g., BSSs) which are configured to interact with multiple wireless devices (e.g., MTC devices) in accordance with the present disclosure (illustrated in FIG. 2). Then, a discussion is provided about several technical features (e.g., working assumptions) where one or more of these technical features can be implemented by the CN node and the RAN node as a basis to help address the aforementioned problems associated with the prior art and realize a complete solution for implementing the eDRX functionality. Finally, a discussion is provided to explain the functionalities-configurations of the CN node (e.g., SGSN) and the RAN node (e.g., BSS) in accordance with the present disclosure (illustrated in FIGS. 3-6).

Exemplary Wireless Communication Network 200

Referring to FIG. 2, there is illustrated an exemplary wireless communication network 200 in accordance with the present disclosure. The wireless communication network 200 includes a core network 206 (which comprises a CN node 207) and multiple RAN nodes $202_1$ and $202_2$ (only two shown) which interface with multiple wireless devices $204_1$, $204_2$, $204_3$ ... $204_n$. The wireless communication network 200 also includes many well-known components, but for clarity, only the components needed to describe the features of the present disclosure are described herein. Further, the wireless communication network 200 is described herein as being a GSM/EGPRS wireless communication network 200 which is also known as an EDGE wireless communication network 200. However, those skilled in the art will readily appreciate that the techniques of the present disclosure which are applied to the GSM/EGPRS wireless communication network 200 are generally applicable to other types of wireless communication systems, including, for example, WCDMA, LTE, and WiMAX systems.

The wireless communication network 200 includes the RAN nodes $202_1$ and $202_2$ (only two shown) which provide network access to the wireless devices $204_1$, $204_2$, $204_3$ ... $204_n$. In this example, the RAN node $202_1$ is providing network access to wireless device $204_1$ while the RAN node $202_2$ is providing network access to wireless devices $204_2$, $204_3$ ... $204_n$. The RAN nodes $202_1$ and $202_2$ are connected to the core network 206 (e.g., EGPRS core network 206) and, in particular, to the CN node 207. The core network 206 is connected to an external packet data network (PDN) 208, such as the Internet, and a server 210 (only one shown). The wireless devices $204_1$, $204_2$, $204_3$ ... $204_n$ may communicate with one or more servers 210 (only one shown) connected to the core network 206 and/or the PDN 208.

The wireless devices $204_1$, $204_2$, $204_3$ ... $204_n$ may refer generally to an end terminal (user) that attaches to the wireless communication network 200, and may refer to either a MTC device (e.g., a smart meter) or a non-MTC device. Further, the term "wireless device" is generally intended to be synonymous with the term mobile device, mobile station (MS). "User Equipment," or UE, as that term is used by 3GPP, and includes standalone wireless devices, such as terminals, cell phones, smart phones, tablets, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $202_1$ and $202_2$ is used herein in the most general sense to refer to a base station, a wireless access node, or a wireless access point in a wireless communication network 200, and may refer to RAN nodes $202_1$ and $202_2$ that are controlled by a physically distinct radio network controller as well as to more autonomous access points, such as the so-called evolved Node Bs (eNodeBs) in Long-Term Evolution (LTE) networks.

Each wireless device $204_1$, $204_2$, $204_3$ ... $204_n$ may include a transceiver circuit $210_1$, $210_2$, $210_3$ ... $210_n$ for communicating with the RAN nodes $202_1$ and $202_2$, and a processing circuit $212_1$, $212_2$, $212_3$ ... $212_n$ for processing signals transmitted from and received by the transceiver circuit $210_1$, $110_2$, $210_3$ ... $210_n$ and for controlling the operation of the corresponding wireless device $204_1$, $204_2$, $204_3$ ... $204_n$. The transceiver circuit $210_1$, $210_2$, $210_3$ ... $210_n$ may include a transmitter $214_1$, $214_2$, $214_3$ ... $214_n$ and a receiver $216_1$, $216_2$, $216_3$ ... $216_n$, which may operate according to any standard, e.g., the GSM/EDGE standard. The processing circuit $212_1$, $212_2$, $212_3$ ... $212_n$ may include a processor $218_1$, $218_2$, $218_3$ ... $218_n$ and a memory $220_1$, $220_2$, $220_3$ ... $220_n$ for storing program code for controlling the operation of the corresponding wireless device $204_1$, $204_2$, $204_3$ ... $204_n$. The program code may include code for performing the procedures as described hereinafter (e.g., implementing paging cycles in a cellular network, generating a Routing Area Update request including an indication of an eDRX cycle length and a coverage class associated with the device, and performing a registration process including transmitting the Routing Area Update request).

Each RAN node $202_1$ and $202_2$ may include a transceiver circuit $222_1$ and $222_2$ for communicating with wireless devices $204_1$, $204_2$, $204_3$ ... $204_n$, a processing circuit $224_1$ and $224_2$ for processing signals transmitted from and received by the transceiver circuit $222_1$ and $222_2$ and for controlling the operation of the corresponding RAN node $202_1$ and $202_2$, and a network interface $226_1$ and $226_2$ for communicating with the core network 206. The transceiver circuit $222_1$ and $222_2$ may include a transmitter $228_1$ and $228_2$ and a receiver $230_1$ and $230_2$, which may operate according to any standard, e.g., the GSM/EDGE standard. The processing circuit $224_1$ and $224_2$ may include a processor $232_1$ and $232_2$, and a memory $234_1$ and $234_2$ for storing program code for controlling the operation of the corresponding RAN node $202_1$ and $202_2$. The program code may include code for performing the procedures as described hereinafter (e.g., transmitting a RAU request associated with a wireless device to a CN node, receiving a page request from the CN node for the wireless device, using information in the page request to calculate the next occurrence of the nominal paging group for the wireless device, and transmitting system information to the CN node regarding the one or more managed cells, wherein the system information for each of the one or more managed cells indicates: (1) whether an eDiscontinuous Receive Cycle (eDRX) cycle is supported; and (2) a maximum eDRX cycle length supported within a set of eDRX cycle lengths).

The CN node 207 (e.g., SGSN 207, Mobility Management Entity (MME) 207) may include a transceiver circuit 236 for communicating with the RAN nodes $202_1$ and $202_2$, a processing circuit 238 for processing signals transmitted from and received by the transceiver circuit 236 and for controlling the operation of the CN node 207, and a network interface 240 for communicating with the RAN nodes $202_1$ and $202_2$. The transceiver circuit 236 may include a transmitter 242 and a receiver 244, which may operate according to any standard, e.g., the GSM/EDGE standard. The processing circuit 238 may include a processor 246 and a memory 248 for storing program code for controlling the operation of the CN node 207. The program code may include code for performing the procedures as described hereinafter (e.g., receiving a packet for delivery to a wireless device, buffering the packet, receiving/maintaining BSS specific TDMA FN information, receiving system information indicating support for eDRX and a maximum supported eDRX cycle length, determining a paging area, an eDRX cycle length, and a coverage class associated with the wireless device, determining a nominal paging group for the device using an IMSI, the eDRX cycle length, and the coverage class associated with the wireless device, maintaining a counter, transmitting a paging request including the counter value, the IMSI, the eDRX cycle length, and the coverage class associated with the wireless device before the next occurrence of the nominal paging group for the wireless device, incrementing the counter upon determining failure to receive a page response, resetting the counter upon receipt of a page response, and forwarding the buffered packet for delivery to the wireless device).

Complete Solution for Implementing eDRX

As discussed in the Background Section, the traditional SGSN (traditional CN node) upon receiving an IP packet (e.g., containing a trigger) for delivery to a target wireless device that is making use of eDRX will respond by immediately sending a corresponding paging request to a BSS (traditional RAN node). When this occurs, there is the possibility that the next paging based instance of reachability for the target wireless device may occur well beyond the point in time when the BSS receives the paging request. This can be problematic considering that (a) the BSS may be limited in how long the BSS can buffer the paging request while waiting for the next paging opportunity for the target wireless device operating in eDRX mode, and (b) the SGSN may consider the paging request to have failed or the target wireless device to be unreachable if the SGSN does not receive a corresponding page response from the BSS within a relatively short time frame. These problems and other problems are addressed by the present disclosure as discussed hereinafter.

As a first step towards realizing a complete solution for eDRX, a basic technical feature can be adopted whereby the SGSN 207 (CN node 207) will have the ability to buffer a downlink IP packet 305 intended for a target wireless device $204_3$ (for example) for an extended time period (e.g., up to 1 hour). This leaves open the challenge of how the SGSN 207 can now determine an appropriate time for taking further steps towards delivering the buffered IP packet 305 to the target wireless device $204_3$. This challenge can be met as described hereinafter.

Technical Feature 1: An SGSN 207 will have the ability to buffer a downlink IP packet 305 for an extended time period prior to delivering the buffered IP packet 305 to the target wireless device $204_3$.

Synchronization and TDMA FN Information

In practice, it can be expected that all cells $321_1$, $321_2 \ldots 321_n$ (for example) managed by any given BSS $202_2$ (for example) will be synchronized from a TDMA FN perspective to a high degree, such that the transmission of TDMA FN sequences transmitted over the radio interface of these cells $321_1$, $321_2 \ldots 321_n$ will at most differ by about, for example, a few milliseconds. As part of Gb interface management procedures, wherein the Gb interface connects the BSS $202_2$ (RAN node $202_2$) to the SGSN 207 (CN node 207) in the GPRS core network 206, knowledge of BSS specific TDMA FN information 307 can be conveyed from the BSS $202_2$ to the SGSN 207, thereby providing the SGSN 207 with near real time knowledge (e.g., accurate within a few milliseconds) of ongoing TDMA frame transmissions within the overall TDMA FN space for each cell $321_1$, $321_2 \ldots 321_n$ managed by any given BSS $202_2$. This near real time knowledge of ongoing TDMA frame transmissions combined with knowledge of the International Mobile Subscriber Identity (IMSI), eDRX cycle, and coverage class associated with a target wireless device $204_3$ (for example) allows the SGSN 207 to calculate the next occurrence of the nominal paging group for the target wireless device $204_3$. In this regard, see the 3GPP TSG-GERAN Meeting #63 Tdoc GP-140605, entitled "GSM Evolution for cellular IoT—PCH Overview" dated Aug. 25-29, 2014, which discusses an IMSI based hashing algorithm that takes into account the eDRX cycle length and coverage class of a target wireless device to determine the nominal paging group for the target wireless device (the entire contents of this document are hereby incorporated herein by reference for all purposes).

Technical Feature 2: The frame structure in all cells $321_1$, $321_2 \ldots 321_n$ served by a BSS $202_2$ belonging to any given vendor will be aligned, for example, on about a ±5 or ±10 milliseconds level.

Technical Feature 3: The Gb interface management procedures will be enhanced to support the transmission of BSS specific TDMA FN information 307 from the BSS $202_2$ to the SGSN 207, which may then be maintained by the SGSN 207 indefinitely.

Technical Feature 4: The SGSN 207 uses the IMSI, eDRX cycle, and coverage class of a target wireless device $204_3$ (for example) and the TDMA FN information 307 to determine the ongoing occurrences of the nominal paging group for that target wireless device $204_3$ (for example) within the context of each BSS $202_2$ managing cells $321_1$, $321_2 \ldots 321_n$ in the corresponding paging area.

eDRX in GERAN

The Technical Features 1-4 or any combination thereof listed above could be used as a basis for further developing a full solution for eDRX for GERAN (i.e., eDRX for Study of Power Saving for MTC Devices (uPoD) and GSM Evolution based Cellular Internet of Things (CIoT)) as described below.

Selecting an eDRX Cycle

A cell $321_1$, $321_2 \ldots 321_n$ that supports eDRX shall support a set of eDRX cycle lengths subject to the requirement that each member of the set shall occur an integral number of times within the full TDMA FN space. This set of eDRX cycle lengths, an example of which is shown in TABLE 1, shall be common to all GERAN cells $321_1$, $321_2 \ldots 321_n$ that support eDRX, since it is based on parsing the GERAN TDMA FN space.

TABLE 1

Set of eDRX Cycle Lengths

| Extended DRX Cycle Value (EXTENDED_DRX) | Target Extended DRX Cycle Length | Number of 51-MFs per Extended DRX Cycle (EXTENDED_DRX_MFRMS) | Extended DRX Cycles per TDMA FN Space |
|---|---|---|---|
| 0 | ~30 seconds | 128 | 416 |
| 1 | ~60 seconds | 256 | 208 |
| 2 | ~2 minutes | 512 | 104 |
| 3 | ~4 minutes | 1024 | 52 |
| 4 | ~6.5 minutes | 1664 | 32 |
| 5 | ~8 minutes | 2048 | 26 |
| 6 | ~13 minutes | 3328 | 16 |
| 7 | ~16 minutes | 4096 | 13 |

TABLE 1-continued

Set of eDRX Cycle Lengths

| Extended DRX Cycle Value (EXTENDED_DRX) | Target Extended DRX Cycle Length | Number of 51-MFs per Extended DRX Cycle (EXTENDED_DRX_MFRMS) | Extended DRX Cycles per TDMA FN Space |
|---|---|---|---|
| 8 | ~26 minutes | 6656 | 8 |
| 9 | ~52 minutes | 13312 | 4 |

Note 1:
53248 51-multiframes (MFs) occur with the TDMA FN space (i.e., 2715648 TDMA frames).
Note 2:
All remaining EXTENDED_DRX values may be reserved.

If the maximum amount of time that any given SGSN 207 implementation supports buffering a downlink IP packet 305 before sending the IP packet 305 to the BSS 202$_2$ is X minutes, then each cell 321$_1$, 321$_2$ . . . 321$_n$ in a RAI managed by that SGSN 207 should indicate a maximum eDRX cycle length that does not exceed X minutes. As such, a cell 321$_1$, 321$_2$ . . . 321$_n$ that sends system information 303 indicating that the cell 321$_1$, 321$_2$ . . . 321$_n$ supports eDRX shall therefore also indicate the maximum eDRX cycle length supported within the set. To accomplish this:

The Routing Area Update (RAU) Request 301 shall be modified to include an indication of the eDRX cycle length selected (e.g., as desired or requested) by the wireless device 204$_3$ (for example) and the estimated coverage class of the wireless device 204$_3$.

After the wireless device 204$_3$ (for example) registers (e.g., performs a RAU), the serving SGSN 207 knows the wireless device's (a) paging area, (b) an eDRX cycle length (e.g., a requested or desired eDRX cycle length as indicated by the EXTENDED_DRX value of TABLE 1 included in the RAU Request 301), (c) estimated coverage class (e.g., also included in the RAU Request 301); and (d) the wireless device's IMSI (e.g., also included in the RAU Request 301). Therefore, the serving SGSN 207 knows how to determine the ongoing occurrences of the wireless device's nominal paging group for each BSS 202$_2$ (for example) that is managing cell(s) 321$_1$, 321$_2$ . . . 321$_n$ in the corresponding paging area.

Technical Feature 5: Each member of the set of eDRX cycle lengths supported in a cell 321$_1$, 321$_2$ . . . 321$_n$ occurs an integral number of times within the TDMA FN space, where the set of possible eDRX cycle lengths shall be common to all GERAN cells 321$_1$, 321$_2$ . . . 321$_n$ that support eDRX.

Technical Feature 6: System Information 303 shall indicate if eDRX is supported in a cell 321$_1$, 321$_2$ . . . 321$_n$ and the maximum eDRX cycle length of the set allowed in the serving cell 321$_1$, 321$_2$ . . . 321$_n$ (see TABLE 1). Further, the indicated maximum eDRX cycle length shall not exceed the maximum time period that the corresponding SGSN 207 can buffer a downlink IP packet 305.

Technical Feature 7: The RAU Request 301 shall be modified to include an indication of the eDRX cycle length selected (e.g., as desired or requested) by a wireless device 204$_3$ (for example) and the wireless device's estimated downlink coverage class.

Managing Downlink IP Packets

When the SGSN 207 first determines that the SGSN 207 has downlink IP payload 305 for delivery to a given wireless device 204$_3$ (for example) and the corresponding wireless device's ready-timer is not running, the SGSN 207 calculates the next occurrence of the wireless device's nominal paging group using the IMSI, the eDRX cycle, and the coverage class of the wireless device 204$_3$ along with the TDMA FN information 307 that the SGSN 207 has for each BSS 202$_2$ (for example) managing one or more cells 321$_1$, 321$_2$ . . . 321$_n$ (for example) in the corresponding paging area.

The SGSN 207 sends a paging request 309 to each BSS 202$_2$ (one shown in this example) in the paging area shortly before the next occurrence of the wireless device's nominal paging group in the cells 321$_1$, 321$_2$ . . . 321$_n$ managed by the BSS 202$_2$ (one shown in this example)

Each paging request 309 comprises information (e.g., eDRX cycle length, coverage class, and IMSI of the wireless device 204$_3$) that allows the BSS 202$_2$ (for example) to determine the next occurrence of the wireless device's nominal paging group.

Upon receiving a paging response 311 from a BSS 202$_2$ (for example), the SGSN 207 forwards the available IP packet 305 to that BSS 202$_2$ for delivery to the target wireless device 204$_3$.

Technical Feature 8: Paging requests 309 transmitted from the SGSN 207 to the BSS 202$_2$ (one shown in this example) shall include an indication of the eDRX cycle length and the estimated coverage class identified by the target wireless device 204$_3$ (for example) in its last registration (e.g., RAU Request 301).

Technical Feature 9: Upon receiving a downlink IP packet 305, the SGSN 207 assumes that the SGSN 207 can buffer the IP packet 305 for an extended time period (e.g., up to 1 hour) with no concern for potential impacts of this buffering on the application server 210 (for example) from which the SGSN 207 received the IP packet 305.

Technical Feature 10: The SGSN 207 maintains a running counter that is incremented each time the SGSN 207 fails to receive a page response 311 (associated with a paging request 309 for a specific IP packet 305) from a wireless device 204$_3$ (for example) and is reset each time the SGSN 207 successfully receives a page response 311, where the value of this running counter is included in each paging request 309 that the SGSN 207 sends to the BSS 202$_2$ for the corresponding wireless device 204$_3$ (for example).

It is proposed that the Technical Features 1-10 or any combination thereof listed above can be used as the basis for supporting eDRX within GERAN (i.e., eDRX for both uPoD and GSM Evolution based CIoT).

Basic Functionalities—Configurations of CN node 207 and RAN Node 202$_2$

Figure 3:
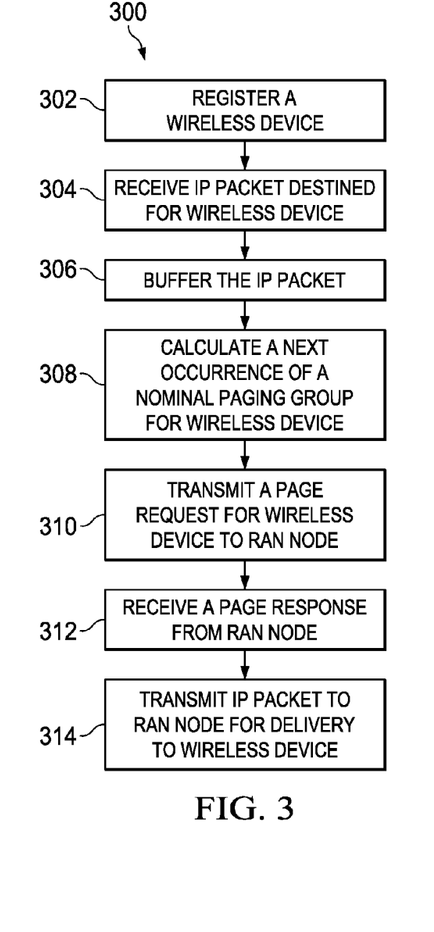
FIG. 3 is a flowchart of a method implemented in the CN node in accordance with an embodiment of the present disclosure.

Referring to FIG. 3, there is a flowchart of a method 300 implemented in the CN node 207 (e.g., SGSN 207) in accordance with an embodiment of the present disclosure. At step 302, the CN node 207 registers a wireless device 204$_3$ (for example) such that the wireless device 204$_3$ can receive or transmit IP packets to or from another device such as the application server 210. In one embodiment, the CN node 207 registers the wireless device 204$_3$ upon receiving a RAU request 301 which comprises an IMSI, an eDRX cycle (e.g., a requested or desired eDRX cycle), and an estimated coverage class of the wireless device 204$_3$ (see technical feature 7) (see also FIG. 2). If desired, the CN node 207 may perform the register step 302 using the information in the received RAU request 301 and using system information 303 that was previously received from the RAN node 202$_2$ that manages one or more cells 321$_1$, 321$_2$ . . . 321$_n$ in the paging area of the wireless device 204$_3$. The system information 303 indicates for each of the one or more managed cells $321_1, 321_2 \ldots 321_n$ the following: (1) whether an eDRX cycle is supported; and (2) a maximum eDRX cycle length supported within a set of eDRX cycle lengths (see technical feature 6). For instance, the CN node 207 can use the system information 303 to: (a) ensure that the RAU request 301 for eDRX is accepted only if the corresponding cell(s) $321_1, 321_2 \ldots 321_n$ actually supports eDRX and (b) ensure that the eDRX cycle length requested within the RAU request 301 does not exceed the maximum eDRX cycle length actually supported by the cell(s) $321_1, 321_2 \ldots 321_n$. Further, each of the one or more managed cells $321_1, 321_2 \ldots 321_n$ can support a set of eDRX cycle lengths and each member of the set of eDRX cycle lengths occurs an integral number of times within a TDMA FN space (technical feature 5 and TABLE 1). In addition, each of the one or more managed cells $321_1, 321_2 \ldots 321_n$ can be synchronized from the TDMA FN perspective to be aligned at about a ±5 or ±10 milliseconds level (technical feature 2).

At step 304, the CN node 207 receives an IP packet 305 from an application server 210 (for example) that is destined for the wireless device $204_3$. At step 306, the CN node 207 buffers the IP packet 305 for a predetermined time (e.g., up to one hour) (see technical features 1 and 9). If the system information 303 described above with the registering step 302 is used then the system information 303 could be configured such that the indicated maximum eDRX cycle length for each managed cell $321_1, 321_2 \ldots 321_n$ would not exceed the predetermined time (e.g., up to one hour) that the IP packet 305 is permitted to be buffered by the CN node 207 after the receipt of the IP packet 305 (technical feature 6).

At step 308, the CN node 207 calculates a next occurrence of a nominal paging group for the wireless device $204_3$. In one example, the CN node 207 performs the calculating step 308 by utilizing (1) an IMSI, an eDRX cycle (e.g., a requested or desired eDRX cycle), and an estimated coverage class associated with the wireless device $204_3$ (this information is obtained from the RAU request 301), and (2) TDMA FN information 307 which is received from the RAN node $202_2$ and indicates ongoing TDMA frame transmissions within an overall TDMA FN space for each of one or more cells $321_1, 321_2 \ldots 321_n$ which are managed by the RAN node $202_2$ (technical features 3 and 4). For example, the CN node 207 can use the IMSI, the eDRX cycle, and the estimated coverage class of the wireless device $204_3$ along with the TDMA FN information 307 to calculate the next occurrence of the nominal paging group for the wireless device $204_3$ as follows:

The nominal paging group of the wireless device $204_3$ occurs once every eDRX cycle.

Assuming the wireless device $204_3$ is using coverage class 1 on the downlink then its nominal paging group occurs if the PCH block number=NOMINAL PAGING_GROUP (0 . . . N-1)=mod (IMSI, N).

N=number of paging groups on one CCCH within a given eDRX cycle=(number of paging blocks per 51-multiframe of the CCCH)*(Number of 51-MF per negotiated eDRX Cycle=EXTENDED_DRX_MFRMS).

The specific set of PCH blocks comprising the nominal paging group is determined by the actual downlink coverage class of the device $204_3$ but will always include the PCH block identified using coverage class 1.

The use of the TDMA FN information 307 in this calculation is important because it allows the CN node 207 to determine when the next instance or occurrence of the nominal paging group will occur in the time domain for the wireless device $204_3$.

At step 310, the CN node 207 transmits a page request 309 associated with the wireless device $204_3$ to the RAN node $202_2$, wherein the page request 309 is transmitted before, for example at a predetermined or determinable time (e.g., 5 seconds) before, the next occurrence of the nominal paging group for the wireless device $204_3$. In one example, the page request 309 comprises an indication of an eDRX cycle (e.g., a requested or desired eDRX cycle), the IMSI and an estimated coverage class of the wireless device $204_3$ (this information is obtained from the RAU request 301) (technical feature 8). If desired, the page request 309 can also comprise a value of a running counter that is incremented by the CN node 207 each time a page response (associated with a page request for a specific IP packet) is not received from the wireless device $204_3$ and is reset each time a page response (associated with a page request) is received from the wireless device $204_3$ (technical feature 10).

At step 312, the CN node 207 receives a page response 311 from the RAN node $202_2$. Upon receiving the page response 311, the CN node 207 at step 314 transmits the IP packet 305 to the RAN node $202_2$ for delivery to the wireless device $204_3$. An advantage of the CN node 207 implementing the method 300 is that by deferring the transmission of the page request 309 according to the CN node 207's knowledge of when the next nominal paging group occurs for the wireless device $204_3$ the CN node 207 will have a realistic expectation of receiving a corresponding page response 311 from wireless device $204_3$ shortly after transmitting the page request 309. This is beneficial since it avoids the page request timeout scenario that would otherwise commonly occur if the CN node 207 were to use legacy procedures. In this regard, when the traditional CN node transmits the page request associated with the wireless device to the RAN node without taking into account the eDRX cycle of the wireless device (i.e., the probability of the traditional CN node transmitting a page request shortly before the occurrence of the next nominal paging group for the wireless device without explicitly taking into account the wireless device's eDRX cycle is low). The penalty incurred by the traditional CN node experiencing the page request timeout scenario is that the traditional CN node may re-attempt paging (using an even greater set of cells for the paging re-attempt), thereby wasting processing power, and wasting signaling capacity on the data link to each RAN node to which it transmits either the initial page request or a re-attempted page request and potentially falsely concluding that the wireless device is unreachable (due to a lack of page response). In addition, without knowing the coverage class of the wireless device the traditional CN node would not be able to indicate the coverage class information in the page request sent to the RAN node and the RAN node would therefore not be able to determine the set of PCH blocks to use for transmitting the page request over the radio interface to the wireless device.

Figure 4:
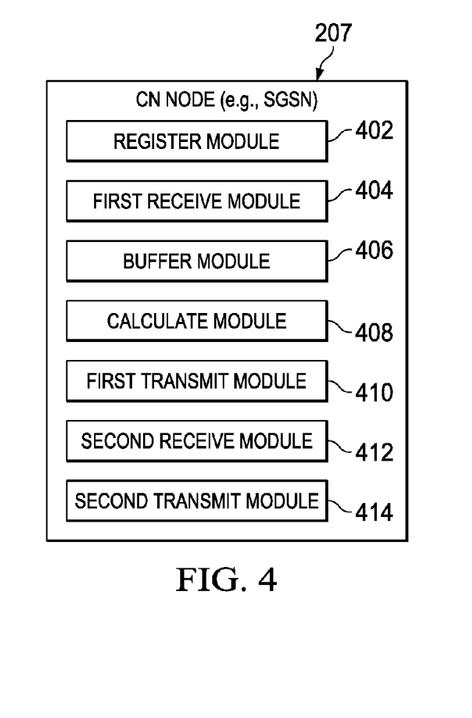
FIG. 4 is a block diagram illustrating an exemplary structure of the CN node configured in accordance with an embodiment of the present disclosure.

Referring to FIG. 4, there is a block diagram illustrating structures of an exemplary CN node 207 (for example) configured in accordance with an embodiment of the present disclosure. In one embodiment, the CN node 207 may comprise a register module 402, a first receive module 404, a buffer module 406, a calculate module 408, a first transmit module 410, a second receive module 412, and a second transmit module 414. The register module 402 is configured to register a wireless device $204_3$ (for example) such that the wireless device $204_3$ can receive or transmit IP packets to or from another device such as the application server 210 (for example). In one embodiment, the register module 402 is configured to register the wireless device 204₃ upon receiving a RAU request 301 which comprises an IMSI, an eDRX cycle (e.g., a requested or desired eDRX cycle), and an estimated coverage class of the wireless device 204₃ (see technical feature 7). If desired, the register module 402 may register the wireless device 104₃ using the information in the received RAU request 301 and by using system information 303 that was previously received from the RAN node 202₂ that manages one or more cells 321₁, 321₂ . . . 321ₙ in the paging area of the wireless device 204₃. The system information 303 indicates for each of the one or more managed cells 321₁, 321₂ . . . 321ₙ the following: (1) whether an eDRX cycle is supported; and (2) a maximum eDRX cycle length supported within a set of eDRX cycle lengths (see technical feature 6). For instance, the register module 402 can use the system information 303 to: (a) ensure that the RAU request 301 for eDRX is accepted only if the corresponding cell(s) 321₁, 321₂ . . . 321ₙ actually supports eDRX and (b) ensure that the eDRX cycle length requested within the RAU Request 301 does not exceed the maximum eDRX cycle length actually supported by the cell(s) 321₁, 321₂ . . . 321ₙ. Further, each of the one or more managed cells 321₁, 321₂ . . . 321ₙ can support a set of eDRX cycle lengths and each member of the set of eDRX cycle lengths occurs an integral number of times within a TDMA FN space (technical feature 5 and TABLE 1). In addition, each of the one or more managed cells 321₁, 321₂ . . . 321ₙ can be synchronized from the TDMA FN perspective to be aligned at about a ±5 or ±10 milliseconds level (technical feature 2).

The first receive module 404 is configured to receive an IP packet 305 from an application server 210 (for example) that is destined for the wireless device 204₃. The buffer module 406 is configured to buffer the IP packet 305 for a predetermined time (e.g., up to one hour) (see technical features 1 and 9). If the system information 303 described above with the registering step 302 is used then the system information 303 could be configured such that the indicated maximum eDRX cycle length for each managed cell 321₁, 321₂ . . . 321ₙ would not exceed the predetermined time (e.g., up to one hour) that the IP packet 305 is permitted to be buffered by the CN node 207 after the receipt of the IP packet 305 (technical feature 6).

The calculate module 408 is configured to calculate a next occurrence of a nominal paging group for the wireless device 204₃. In one example, the calculate module 408 can perform the calculating operation by utilizing (1) an IMSI, an eDRX cycle (e.g., a requested or desired eDRX cycle), and an estimated coverage class associated with the wireless device 204₃ (this information is obtained from the RAU request 301), and (2) TDMA FN information 307 which is received from the RAN node 202₂ and indicates ongoing TDMA frame transmissions within an overall TDMA FN space for each of one or more cells 321₁, 321₂ . . . 321ₙ which are managed by the RAN node 202₂ (technical features 3 and 4). For example, the CN node 207 can use the IMSI, the eDRX cycle, and the estimated coverage class of the wireless device 204₃ along with the TDMA FN information 307 to calculate the next occurrence of the nominal paging group for the wireless device 204₃ as follows:

The nominal paging group of the wireless device 204₃ occurs once every eDRX cycle.

Assuming the wireless device 204₃ is using coverage class 1 on the downlink then its nominal paging group occurs if the PCH block number=NOMINAL PAGING_GROUP (0 . . . N-1)=mod (IMSI, N).

N=number of paging groups on one CCCH within a given eDRX cycle=(number of paging blocks per 51-multi-frame of the CCCH)*(Number of 51-MF per negotiated eDRX Cycle=EXTENDED_DRX_MFRMS).

The specific set of PCH blocks comprising the nominal paging group is determined by the actual downlink coverage class of the device 204₃ but will always include the PCH block identified using coverage class 1.

The use of the TDMA FN information 307 is important because it allows the CN node 207 to determine when the next instance or occurrence of the nominal paging group will occur in the time domain for the wireless device 204₃.

The first transmit module 410 is configured to transmit a page request 309 associated with the wireless device 204₃ to the RAN node 202₂, wherein the page request 309 is transmitted before, for example at a predetermined or determinable time (e.g., 5 seconds) before, the next occurrence of the nominal paging group for the wireless device 204₃. In one example, the page request 309 comprises an indication of an eDRX cycle (e.g., a requested or desired eDRX cycle), the IMSI and an estimated coverage class of the wireless device 204₃ (this information is obtained from the RAU request 301) (technical feature 8). If desired, the page request 309 can also comprise a value of a running counter that is incremented by the CN node 207 each time a page response (associated with a page request for a specific IP packet) is not received from the wireless device 204₃ and is reset each time a page response (associated with a page request) is received from the wireless device 204₃ (technical feature 10).

The second receive module 412 is configured to receive a page response 311 from the RAN node 202₂. The second transmit module 414 upon receipt of the page response 311 is configured to transmit the IP packet 305 to the RAN node 202₂ for delivery to the wireless device 204₃.

As those skilled in the art will appreciate, the above-described modules 402, 404, 406, 408, 410, 412 and 414 of the CN node 207 (e.g., SGSN 207) may be implemented separately as suitable dedicated circuits. Further, the modules 402, 404, 406, 408, 410, 412 and 414 can also be implemented using any number of dedicated circuits through functional combination or separation. In some embodiments, the modules 402, 404, 406, 408, 410, 412 and 414 may be even combined in a single application specific integrated circuit (ASIC). As an alternative software-based implementation, the CN node 207 (e.g., SGSN 207) may comprise a memory 248, a processor 246 (including but not limited to a microprocessor, a microcontroller or a Digital Signal Processor (DSP), etc.) and a transceiver 236. The memory 248 stores machine-readable program code executable by the processor 246 to cause the CN node 207 (e.g., SGSN 207) to perform the steps of the above-described method 300.

Figure 5:
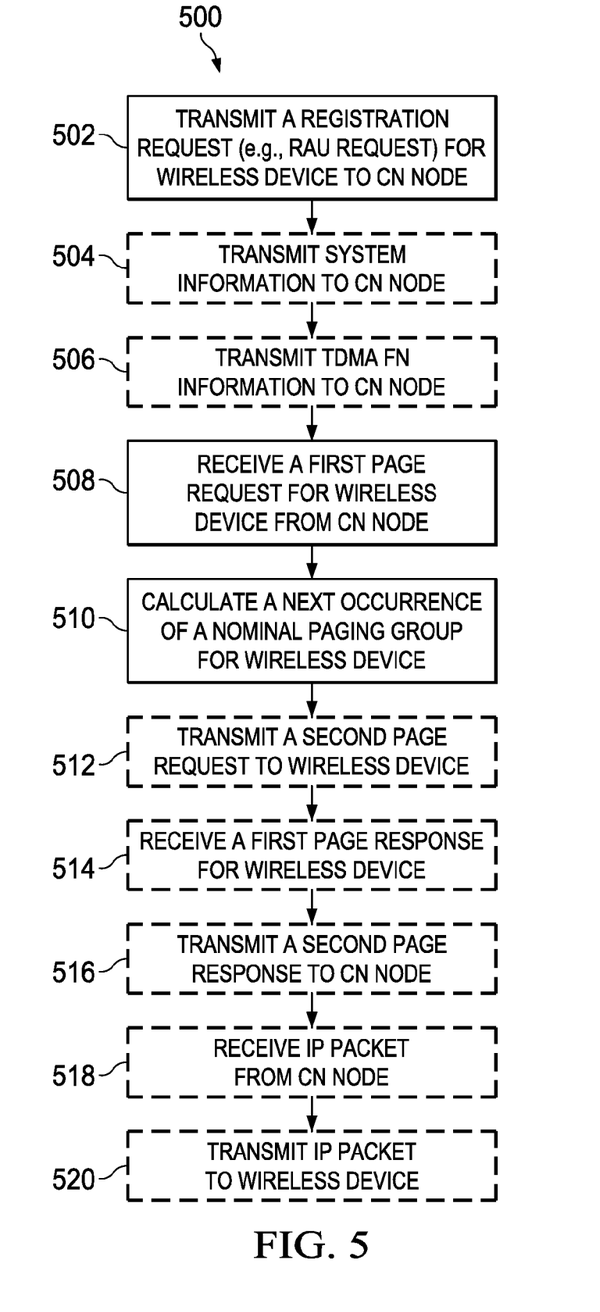
FIG. 5 is a flowchart of a method implemented in the RAN node in accordance with an embodiment of the present disclosure; and, FIG. 6 is a block diagram illustrating an exemplary structure of the RAN node configured in accordance with an embodiment of the present disclosure.

Referring to FIG. 5, there is a flowchart of a method 500 implemented in a RAN node 202₂ (for example) in accordance with an embodiment of the present disclosure. At step 502, the RAN node 202₂ transmits a registration request 301 associated with the wireless device 204₃ (for example) to the CN node 207. In one embodiment, the registration request 301 is a RAU request which comprises an IMSI, an eDRX cycle (e.g., a requested or desired eDRX cycle), and an estimated coverage class of the wireless device 204₃ (see technical feature 7). If desired, the RAN node 202₂ at step 504 (which may occur before step 502) can transmit system information 303 to the CN node 207, where the system information 303 indicates for each of one or more cells $321_1$, $321_2 \ldots 321_n$ managed by the RAN node $202_2$ the following: (1) whether an eDRX cycle is supported; and (2) a maximum eDRX cycle length supported within a set of eDRX cycle lengths (see technical feature 6) (see FIG. 3's step 302 for discussion on how the CN node 207 can use the RAU request 301 and the system information 303 (if any) to register the wireless device $204_3$). In one embodiment, each of the one or more managed cells $321_1$, $321_2 \ldots 321_n$ can support a set of eDRX cycle lengths and each member of the set of eDRX cycle lengths occurs an integral number of times within a TDMA FN space (technical feature 5 and TABLE 1). In addition, each of the one or more managed cells $321_1$, $321_2 \ldots 321_n$ can be synchronized from the TDMA FN perspective to be aligned at about a ±5 or ±10 milliseconds level (technical feature 2).

At step 506 (which may occur before step 502), the RAN node $202_2$ can transmit TDMA FN information 307 to the CN node 207. The TDMA FN information 307 indicates ongoing TDMA frame transmissions within an overall TDMA FN space for the one or more managed cells $321_1$, $321_2 \ldots 321_n$ (technical feature 3) (see FIG. 3's step 308 for discussion on how the CN node 207 can use the TDMA FN information 307 (if transmitted) to calculate the next occurrence of the nominal paging group for the wireless device $204_3$).

At step 508, the RAN node $202_2$ receives a page request 309 associated with the wireless device $204_3$ from the CN node 207. The page request 309 is received before, for example at a predetermined or determinable time (e.g., 5 seconds) before, the next occurrence of the nominal paging group for the wireless device $204_3$.

At step 510, the RAN node $202_2$ calculates the next occurrence of the nominal paging group for the wireless device $204_3$ using information within the page request 309. In one example, the page request 309 comprises an indication of an eDRX cycle (e.g., a requested or desired eDRX cycle), the IMSI and an estimated coverage class of the wireless device $204_3$ (technical feature 8). If desired, the page request 309 can also comprise a value of a running counter that is maintained and incremented by the CN node 207 each time a page response (associated with a corresponding page request for a specific IP packet) is not received from the wireless device $204_3$ and is reset each time a page response (associated with a corresponding page request) is received from the wireless device $204_3$ (technical feature 10). For example, the RAN node $202_2$ can use the IMSI, the eDRX cycle, and the estimated coverage class of the wireless device $204_3$ to calculate the next occurrence of the nominal paging group for the wireless device $204_3$ as follows:

The nominal paging group of the wireless device $204_3$ occurs once every eDRX cycle.

Assuming the wireless device $204_3$ is using coverage class 1 on the downlink then its nominal paging group occurs if the PCH block number=NOMINAL PAGING_GROUP (0 ... N−1)=mod (IMSI, N).

N=number of paging groups on one CCCH within a given eDRX cycle=(number of paging blocks per 51-multiframe of the CCCH)*(Number of 51-MF per negotiated eDRX Cycle=EXTENDED_DRX_MFRMS).

The specific set of PCH blocks comprising the nominal paging group is determined by the actual downlink coverage class of the device $204_3$ but will always include the PCH block identified using coverage class 1.

The RAN node $202_2$ inherently has knowledge of the TDMA FN information associated with the one or more cells $321_1$, $321_2 \ldots 321_n$ that it manages which it uses to determine when the next instance of the nominal paging group will occur in the time domain for the target wireless device $204_3$.

At step 512, the RAN node $202_2$ transmits a second page request 313 to the wireless device $204_3$ at the next occurrence of the nominal paging group for the wireless device $204_3$. The first page request 309 and the second page request 311 are two different messages where the first page request 309 that is received by the RAN node $202_2$ from the CN node 207 triggers the RAN node $202_2$ to send a radio interface version of the page request 309 which is also called a page request but this radio interface version page request 313 can include paging information for multiple wireless devices $204_2$ etc. . . .

At step 514, the RAN node $202_2$ receives a first page response 315 from the wireless device $204_3$. At step 516, the RAN node $202_2$ transmits a second page response 311 to the CN node 207. The page response 315 that is transmitted from the wireless device $204_3$ to the RAN node $202_2$ logically triggers the RAN node $202_2$ to send the page response 311 to the CN node 207. These two page responses 311 and 315 could be the same message (e.g., a short Logical Link Control (LLC) PDU) for GERAN or they could be two different messages for other radio access technologies.

At step 518, the RAN node $202_2$ receives an IP packet 305 destined for the wireless device $204_3$ from the CN node 207. At step 520, the RAN node $202_2$ transmits the IP packet 305 to the wireless device $204_3$. The other RAN nodes $202_1$ (for example) can also be configured in a similar manner to perform method 500. An advantage of the RAN node $202_2$ implementing the method 500 is that it allows the RAN node $202_2$ to precisely determine the set of PCH blocks comprising the next instance of the nominal paging group (i.e., the next instance of the reachability of the wireless device $204_3$) to use for transmitting the second page request 313 to the wireless device $204_3$ over the radio interface, thereby allowing the wireless device $204_3$ to be reachable using a minimum amount of power. In contrast, without the ability to precisely determine the next instance of device reachability the RAN node $202_2$ will have to use other paging solutions, none of which will be as power efficient (from a wireless device perspective) as method 500 since all other solutions will necessarily require the wireless device to read more than one instance of its nominal paging group per eDRX cycle to support reachability.

Figure 6:
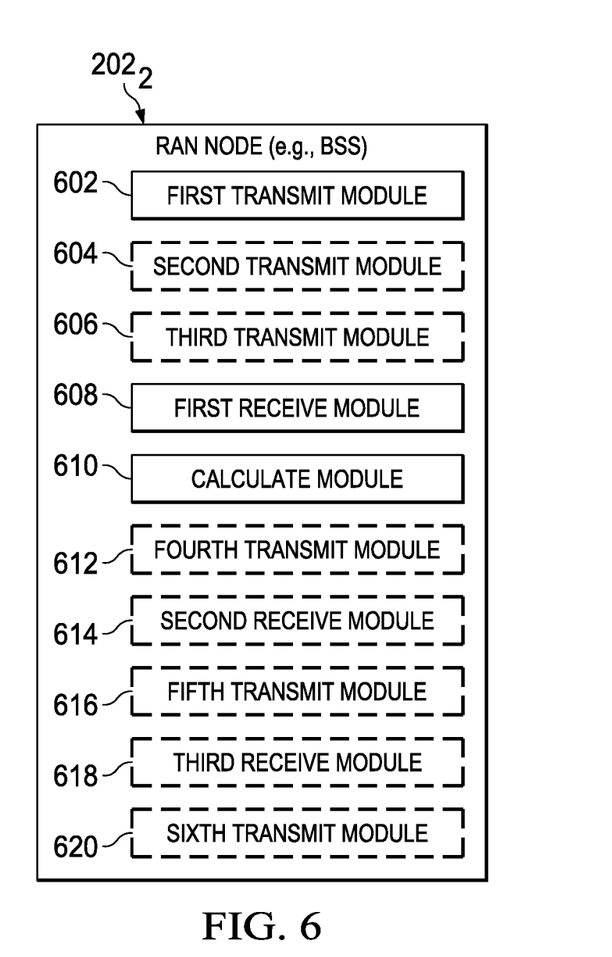

Referring to FIG. 6, there is a block diagram illustrating structures of an exemplary RAN node $202_2$ (for example) configured in accordance with an embodiment of the present disclosure. In one embodiment, the RAN node $202_2$ may comprise a first transmit module 602, a second transmit module 604, a third transmit module 606, a first receive module 608, a calculate module 610, a fourth transmit module 612, a second receive module 614, a fifth transmit module 616, a third receive module 618, and a sixth transmit module 620. The first transmit module 602 is configured to transmit a registration request 301 associated with the wireless device $204_3$ (for example) to the CN node 207. In one embodiment, the registration request 301 is a RAU request which comprises an IMSI, an eDRX cycle (e.g., a requested or desired eDRX cycle), and an estimated coverage class of the wireless device $204_3$ (see technical feature 7). If desired, the second transmit module 604 can be configured to transmit system information 303 (which may occur before transmission of registration request 301) to the CN node 207. The system information 303 indicates for each of one or more cells $321_1$, $321_2$ ... $321_n$ managed by the RAN node $202_2$ the following: (1) whether an eDRX cycle is supported; and (2) a maximum eDRX cycle length supported within of a set of eDRX cycle lengths (see technical feature 6) (see FIG. 3's step 302 for discussion on how the CN node 207 can use the RAU request 301 and the system information 303 (if any) to register the wireless device $204_3$). In one embodiment, each of the one or more managed cells $321_1$, $321_2$ ... $321_n$ can support a set of eDRX cycle lengths and each member of the set of eDRX cycle lengths occurs an integral number of times within a TDMA FN space (technical feature 5). In addition, each of the one or more managed cells $321_1$, $321_2$ ... $321_n$ can be synchronized from the TDMA FN perspective to be aligned at about a ±5 or ±10 milliseconds level (technical feature 2).

The third transmit module 606 is configured to transmit TDMA FN information 307 to the CN node 207 (note: the third transmit module 606 may transmit the TDMA FN information 307 before the first transmit module 602 transmits the registration request 301). The TDMA FN information 307 indicates ongoing TDMA frame transmissions within an overall TDMA FN space for the one or more managed cells $321_1$, $321_2$ ... $321_n$ (technical feature 3) (see FIG. 3's step 308 for discussion on how the CN node 207 can use the TDMA FN information 307 (if transmitted) to calculate the next occurrence of the nominal paging group for the wireless device $204_3$).

The first receive module 608 is configured to receive a page request 309 associated with the wireless device $204_3$ from the CN node 207. The page request 309 is received before, for example at a predetermined or determinable time (e.g., 5 seconds) before, the next occurrence of the nominal paging group for the wireless device $204_3$.

The calculate module 610 is configured to calculate the next occurrence of the nominal paging group for the wireless device $204_3$ using information within the page request 309. In one example, the page request 309 comprises an indication of the IMSI, an eDRX cycle (e.g., a requested or desired eDRX cycle), the IMSI, and an estimated coverage class of the wireless device $204_3$ (technical feature 8). If desired, the page request 309 can also comprise a value of a running counter that is maintained and incremented by the CN node 207 each time a page response (associated with a corresponding page request for a specific IP packet) is not received from the wireless device $204_3$ and is reset each time a page response (associated with a corresponding page request) is received from the wireless device $204_3$ (technical feature 10). For example, the RAN node $202_2$ can use the IMSI, the eDRX cycle, the estimated coverage class of the wireless device $204_3$ to calculate the next occurrence of the nominal paging group for the wireless device $204_3$ as follows:

The nominal paging group of the wireless device $204_3$ occurs once every eDRX cycle.

Assuming the wireless device $204_3$ is using coverage class 1 on the downlink then its nominal paging group occurs if the PCH block number=NOMINAL PAGING_GROUP (0 ... N-1)=mod (IMSI, N).

N=number of paging groups on one CCCH within a given eDRX cycle=(number of paging blocks per 51-multi-frame of the CCCH)*(Number of 51-MF per negotiated eDRX Cycle=EXTENDED_DRX_MFRMS).

The specific set of PCH blocks comprising the nominal paging group is determined by the actual downlink coverage class of the device $204_3$ but will always include the PCH block identified using coverage class 1.

The RAN node $202_2$ inherently has knowledge of the TDMA FN information associated with the one or more cells $321_1$, $321_2$ ... $321_n$ that it manages which it uses to determine when the next instance of the nominal paging group will occur in the time domain for the target wireless device $204_3$.

The fourth transmit module 612 is configured to transmit a second page request 313 to the wireless device $204_3$ at the calculated next occurrence of the nominal paging group for the wireless device $204_3$. The first page request 309 and the second page request 311 are two different messages where the first page request 309 that is received by the RAN node $202_2$ from the CN node 207 triggers the RAN node $202_2$ to send a radio interface version of the page request 309 which is also called a page request but this radio interface version page request 313 can include paging information for multiple wireless devices $204_2$ etc. ...

The second receive module 614 is configured to receive a first page response 315 from the wireless device $204_3$. The fifth transmit module 616 is configured to transmit a second page response 311 to the CN node 207. The page response 315 that is transmitted from the wireless device $204_3$ to the RAN node $202_2$ logically triggers the RAN node $202_2$ to send the page response 311 to the CN node 207. These two page responses 311 and 315 could be the same message (e.g., a short LLC PDU) for GERAN or they could be two different messages for other radio access technologies.

The third receive module 618 is configured to receive an IP packet 305 destined for the wireless device $204_3$ from the CN node 207. The sixth transmit module 620 is configured to transmit the IP packet 305 to the wireless device $204_3$. The other RAN nodes $202_1$ (for example) can also be configured in a similar manner. An advantage of the RAN node $202_2$ being configured in this manner is that it allows the RAN node $202_2$ to precisely determine the set of PCH blocks comprising the next instance of the nominal paging group (i.e., the next instance of the reachability of the wireless device $204_3$) to use for transmitting the second page request 313 to the wireless device $204_3$ over the radio interface, thereby allowing the wireless device $204_3$ to be reachable using a minimum amount of power. In contrast, without the ability to precisely determine the next instance of device reachability the RAN node $202_2$ will have to use other paging solutions, none of which will be as power efficient (from a wireless device perspective) as method 500 since all other solutions will necessarily require the wireless device to read more than one instance of its nominal paging group per eDRX cycle to support reachability.

As those skilled in the art will appreciate, the above-described modules 602, 604, 606, 608, 610, 612, 614, 616, 618, and 620 of the RAN node $202_2$ (e.g., BSS $202_2$) may be implemented separately as suitable dedicated circuits. Further, the modules 602, 604, 606, 608, 610, 612, 614, 616, 618, and 620 can also be implemented using any number of dedicated circuits through functional combination or separation. In some embodiments, the modules 602, 604, 606, 608, 610, 612, 614, 616, 618, and 620 may be even combined in a single application specific integrated circuit (ASIC). As an alternative software-based implementation, the RAN node $202_2$ (e.g., BSS $202_2$) may comprise a memory $234_2$, a processor $232_2$ (including but not limited to a microprocessor, a microcontroller or a Digital Signal Processor (DSP), etc.) and a transceiver $222_2$. The memory $234_2$ stores machine-readable program code executable by the processor $232_2$ to cause the RAN node $202_2$ (e.g., BSS $202_2$) to perform the steps of the above-described method 500.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A core network (CN) node configured to interact with a radio access network (RAN) node and a wireless device, the CN node comprising:
a processor; and,
a memory that stores processor-executable instructions, wherein the processor interfaces with the memory to execute the processor-executable instructions, whereby the CN node is operable to:
register the wireless device;
receive an Internet Protocol (IP) packet destined for the wireless device;
buffer the IP packet for a predetermined time;
calculate a next occurrence of a nominal paging group for the wireless device;
transmit a page request associated with the wireless device to the RAN node, wherein the page request is transmitted before the next occurrence of the nominal paging group for the wireless device, and wherein the page request comprises at least an indication of an extended Discontinuous Receive Cycle (eDRX) cycle, and an estimated coverage class of the wireless device;
receive a page response from the RAN node; and
upon receipt of the page response, transmit the IP packet to the RAN node for delivery to the wireless device.

2. The CN node of claim 1, wherein the CN node is operable to register the wireless device upon receiving a Routing Area Update (RAU) request from the wireless device, wherein the RAU request comprises an International Mobile Subscriber Identity (IMSI), the eDRX cycle, and the estimated coverage class of the wireless device.

3. The CN node of claim 1, wherein the CN node is operable to perform the register operation by using system information received from the RAN node, wherein the system information indicates for each of one or more cells managed by the RAN node whether an eDRX cycle is supported.

4. The CN node of claim 3, wherein the system information further indicates for each of the one or more cells managed by the RAN node a maximum eDRX cycle length supported within a set of eDRX cycle lengths, and wherein the indicated maximum eDRX cycle length for each managed cell does not exceed the predetermined time that the IP packet is permitted to be buffered by the CN node after the receipt of the IP packet.

5. The CN node of claim 1, wherein each of one or more cells managed by the RAN node supports a set of eDRX cycle lengths and each member of the set of eDRX cycle lengths occurs an integral number of times within a Time Division Multiple Access (TDMA) frame number (FN) space.

6. The CN node of claim 5, wherein each of the one or more managed cells are synchronized from the TDMA FN perspective to be aligned at about a 5-10 milliseconds level.

7. The CN node of claim 1, wherein the CN node is further operable to perform the calculate operation by utilizing (1) an International Mobile Subscriber Identity (IMSI), the eDRX cycle, and the estimated coverage class associated with the wireless device; and (2) Time Division Multiple Access (TDMA) frame number (FN) information received from the RAN node indicating ongoing TDMA frame transmissions within an overall TDMA FN space for each of one or more cells managed by the RAN node.

8. The CN node of claim 1, wherein the page request further comprises a value of a running counter that is incremented by the CN node each time a page response is not received from the wireless device and is reset each time a page response is received from the wireless device.

9. A method in a core network (CN) node configured to interact with a radio access network (RAN) node and a wireless device, the method comprising:
registering the wireless device;
receiving an Internet Protocol (IP) packet destined for the wireless device;
buffering the IP packet for a predetermined time;
calculating a next occurrence of a nominal paging group for the wireless device;
transmitting a page request associated with the wireless device to the RAN node, wherein the page request is transmitted before the next occurrence of the nominal paging group for the wireless device, and wherein the page request comprises at least an indication of an extended Discontinuous Receive Cycle (eDRX) cycle, and an estimated coverage class of the wireless device;
receiving a page response from the RAN node; and upon receipt of the page response, transmitting the IP packet to the RAN node for delivery to the wireless device.

10. The method of claim 9, wherein the registering step further comprises receiving a Routing Area Update (RAU) request from the wireless device, wherein the RAU request comprises an International Mobile Subscriber Identity (IMSI), the eDRX cycle, and the estimated coverage class of the wireless device.

11. The method of claim 9, wherein the registering step further comprises using system information received from the RAN node, wherein the system information indicates for each of one or more cells managed by the RAN node whether an eDRX cycle is supported.

12. The method of claim 11, wherein the system information further indicates for each of the one or more cells managed by the RAN node a maximum eDRX cycle length supported within a set of eDRX cycle lengths, and wherein the indicated maximum eDRX cycle length for each managed cell does not exceed the predetermined time that the IP packet is permitted to be buffered by the CN node after the receipt of the IP packet.

13. The method of claim 9, wherein each of one or more cells managed by the RAN node supports a set of eDRX cycle lengths and each member of the set of eDRX cycle lengths occurs an integral number of times within a Time Division Multiple Access (TDMA) frame number (FN) space.

14. The method of claim 13, wherein each of the one or more managed cells are synchronized from the TDMA FN perspective to be aligned at about a 5-10 milliseconds level.

15. The method of claim 9, wherein the calculating step further comprises utilizing (1) an International Mobile Subscriber Identity (IMSI), the eDRX cycle, and the estimated coverage class associated with the wireless device; and (2) Time Division Multiple Access (TDMA) frame number (FN) information received from the RAN node indicating ongoing TDMA frame transmissions within an overall TDMA FN space for each of one or more cells managed by the RAN node.

16. The method of claim 9, wherein the page request further comprises a value of a running counter that is incremented by the CN node each time a page response is not received from the wireless device and is reset each time a page response is received from the wireless device.

17. A radio access network (RAN) node configured to manage one or more cells and further configured to interact with a wireless device and a core network (CN) node, the RAN node comprising:
   a processor; and,
   a memory that stores processor-executable instructions, wherein the processor interfaces with the memory to execute the processor-executable instructions, whereby the radio access network node is operable to:
      transmit, to the CN node, a registration request associated with the wireless device;
      receive, from the CN node, a first page request associated with the wireless device, wherein the first page request is received before a next occurrence of a nominal paging group for the wireless device, and wherein the first page request comprises at least an indication of an extended Discontinuous Receive Cycle (eDRX) cycle, and an estimated coverage class of the wireless device; and,
      calculate the next occurrence of the nominal paging group for the wireless device using information in the first page request.

18. The RAN node of claim 17, wherein the RAN node is further operable to:
   transmit, to the wireless device, a second page request at the calculated next occurrence of the nominal paging group for the wireless device;
   receive, from the wireless device, a first page response;
   transmit, to the CN node, a second page response;
   receive, from the CN node, an Internet Protocol (IP) packet for the wireless device; and,
   transmit the IP packet to the wireless device.

19. The RAN node of claim 17, wherein the registration request is a Routing Area Update (RAU) request which comprises an International Mobile Subscriber Identity (IMSI), the eDRX cycle, and the estimated coverage class of the wireless device.

20. The RAN node of claim 17, wherein the RAN node prior to receiving the first page request is operable to transmit, to the CN node, Time Division Multiple Access (TDMA) frame number (FN) information associated with ongoing TDMA frame transmissions within an overall TDMA FN space for the one or more managed cells.

21. The RAN node of claim 17, wherein the RAN node is further operable to transmit, to the CN node, system information that indicates for each of the one or more managed cells whether an eDRX cycle is supported.

22. The RAN node of claim 21, wherein the system information further indicates for each of the one or more managed cells a maximum eDRX cycle length supported within a set of eDRX cycle lengths, and wherein the indicated maximum eDRX cycle length for each managed cell does not exceed a predetermined time that the IP packet is permitted to be buffered by the CN node.

23. The RAN node of claim 17, wherein each of the one or more managed cells supports a set of eDRX cycle lengths and each member of the set of eDRX cycle lengths occurs an integral number of times within a Time Division Multiple Access (TDMA) frame number (FN) space.

24. The RAN node of claim 23, wherein each of the one or more managed cells are synchronized from the TDMA FN perspective to be aligned at about a 5-10 milliseconds level.

25. The RAN node of claim 17, wherein the first page request further comprises a value of a running counter that is maintained by the CN node and incremented each time a page response is not received from the wireless device and is reset each time a page response is received from the wireless device.

26. A method in a radio access network (RAN) node configured to manage one or more cells and further configured to interact with a wireless device and a core network (CN) node, the method comprising:
   transmitting, to the CN node, a registration request associated with the wireless device;
   receiving, from the CN node, a first page request associated with the wireless device, wherein the first page request is received before a next occurrence of a nominal paging group for the wireless device, and wherein the page request comprises at least an indication of an extended Discontinuous Receive Cycle (eDRX) cycle, and an estimated coverage class of the wireless device; and,
   calculating the next occurrence of the nominal paging group for the wireless device using information in the first page request.

27. The method of claim 26, further comprising:
   transmitting, to the wireless device, a second page request at the calculated next occurrence of the nominal paging group for the wireless device;

receiving, from the wireless device, a first page response;

transmitting, to the CN node, a second page response;

receiving, from the CN node, an Internet Protocol (IP) packet for the wireless device; and, transmitting the IP packet to the wireless device.

28. The method of claim 26, wherein the registration request is a Routing Area Update (RAU) request which comprises an International Mobile Subscriber Identity (IMSI), the eDRX cycle, and the estimated coverage class of the wireless device.

29. The method of claim 26, further comprising, prior to receiving the first page request, transmitting, to the CN node, Time Division Multiple Access (TDMA) frame number (FN) information associated with ongoing TDMA frame transmissions within an overall TDMA FN space for the one or more managed cells.

30. The method of claim 26, further comprising transmitting, to the CN node, system information that indicates for each of the one or more managed cells whether an eDRX cycle is supported.

31. The method of claim 30, wherein the system information further indicates for each of the one or more managed cells a maximum eDRX cycle length supported within a set of eDRX cycle lengths, and wherein the indicated maximum eDRX cycle length for each managed cell does not exceed a predetermined time that the IP packet is permitted to be buffered by the CN node.

32. The method of claim 26, wherein each of the one or more managed cells supports a set of eDRX cycle lengths and each member of the set of eDRX cycle lengths occurs an integral number of times within a Time Division Multiple Access (TDMA) frame number (FN) space.

33. The method of claim 32, wherein each of the one or more managed cells are synchronized from the TDMA FN perspective to be aligned at about a 5-10 milliseconds level.

34. The method of claim 26, wherein the first page request further comprises a value of a running counter that is maintained by the CN node and incremented each time a page response is not received from the wireless device and is reset each time a page response is received from the wireless device.

* * * * *

UNITED STATES PATENT AND TRADEMARK OFFICE
CERTIFICATE OF CORRECTION

PATENT NO. : 10,225,101 B2
APPLICATION NO. : 14/996055
DATED : March 5, 2019
INVENTOR(S) : Diachina et al.

It is certified that error appears in the above-identified patent and that said Letters Patent is hereby corrected as shown below:

In the Specification

In Column 5, Line 6, delete "transmit step," and insert -- transmiting step, --, therefor.

In Column 8, Line 10, delete "$110_2$," and insert -- $210_2$, --, therefor.

In Column 12, Line 13, delete "example)" and insert -- example). --, therefor.

In Column 15, Line 8, delete "wireless device $104_3$" and insert -- wireless device $204_3$ --, therefor.

In Column 18, Lines 10-11, delete "second page request 311" and insert -- second page request 313 --, therefor.

In Column 20, Line 14, delete "second page request 311" and insert -- second page request 313 --, therefor.

In the Claims

In Column 22, Lines 1-2, in Claim 1, delete "extended Discontinuous Receive Cycle (eDRX) cycle," and insert -- extended Discontinuous Receive (eDRX) cycle, --, therefor.

In Column 22, Line 65, in Claim 9, delete "extended Discontinuous Receive Cycle (eDRX) cycle," and insert -- extended Discontinuous Receive (eDRX) cycle, --, therefor.

In Column 23, Lines 62-63, in Claim 17, delete "extended Discontinuous Receive Cycle (eDRX) cycle," and insert -- extended Discontinuous Receive (eDRX) cycle, --, therefor.

In Column 24, Lines 58-59, in Claim 26, delete "extended Discontinuous Receive Cycle (eDRX) cycle," and insert -- extended Discontinuous Receive (eDRX) cycle, --, therefor.

Signed and Sealed this
Eighth Day of September, 2020

Andrei Iancu
*Director of the United States Patent and Trademark Office*